(12) United States Patent
Arx

(10) Patent No.: US 6,392,208 B1
(45) Date of Patent: May 21, 2002

(54) ELECTROFUSING OF THERMOPLASTIC HEATING ELEMENTS AND ELEMENTS MADE THEREBY

(75) Inventor: Theodore Von Arx, La Crescent, MN (US)

(73) Assignee: Watlow Polymer Technologies, Winona, MN (US)

( * ) Notice: Subject to any disclaimer, the term of this patent is extended or adjusted under 35 U.S.C. 154(b) by 0 days.

(21) Appl. No.: 09/369,779

(22) Filed: Aug. 6, 1999

(51) Int. Cl.$^7$ .............................. H05B 3/50; H05B 3/10; H05B 3/00
(52) U.S. Cl. .......................... 219/544; 219/548; 29/611
(58) Field of Search ................................. 219/528, 535, 219/541, 542, 543, 544, 548, 552, 553; 338/226, 231, 275, 276; 29/610.1, 611

(56) References Cited

U.S. PATENT DOCUMENTS

| | | | |
|---|---|---|---|
| 1,043,922 A | 11/1912 | Gold | ........................ 219/523 |
| 1,046,465 A | 12/1912 | Hoyt | |
| 1,058,270 A | 4/1913 | Stephens | .................... 219/217 |
| 1,281,157 A | 10/1918 | Hadaway, Jr. | |

(List continued on next page.)

FOREIGN PATENT DOCUMENTS

| | | |
|---|---|---|
| DE | 35 12 659 A | 9/1986 |
| DE | 3512659 | 10/1986 |
| DE | 38 36 387 C1 | 5/1990 |
| GB | 14562 | 9/1913 |
| GB | 1070849 | 6/1967 |
| GB | 1325084 | 8/1973 |
| GB | 1498792 | 1/1978 |
| GB | 2244898 | 12/1999 |
| JP | 53-134245 | 11/1978 |
| JP | 3-129694 | 6/1991 |
| JP | 07 211438 A | 11/1995 |

OTHER PUBLICATIONS

"Polymers", Guide to Selecting Engineered Materials, a special issue of Advanced Materials & Processes, Metals Park, OH, ASM International, 1989, pp. 92–93.
"Makroblend Polycarbonate Blend, Tedur Polyphenylene Sulfide", Machine Design: Basics of Design Engineering, Cleveland, OH, Penton Publishing, Inc., Jun. 1991, pp. 820–821, 863,866–867.
European Search Report, Jul. 13, 1998.
"At HEI, Engineering is our Middle Name", Heaters Engineering, Inc., Mar. 2, 1995.
"Flexibility and cost Savings with Rope Elements", Heating Engineers, Inc. Aug. 1998.
Desloge Engineering Col, Letter to Lou Steinhauser dated Feb. 19, 1997.

(List continued on next page.)

Primary Examiner—Sang Paik
(74) Attorney, Agent, or Firm—Duane Morris LLP

(57) ABSTRACT

Methods of manufacturing electrical resistance heating elements are provided which include mating a pair of polymeric components around an electrical resistance heating material prior to fusing the polymeric components together, preferably by heat or pressure or both. Methods of stress relieving these polymeric components before, during or after fusing them together, are disclosed. Additionally, thermally conductive, non-electrically conductive additives can be added to improve the service life of the elements. In a further embodiment of this invention, a heating element and method of construction are provided in which first and second polymeric components are joined together with a resistance heating material therebetween. The polymeric components include retention means including a plurality of male connectors located on the first polymeric component, and a plurality of female receiving recesses located on the second polymeric component for mating with the male connectors of the first polymeric component. The polymeric components can optionally be joined together by the fusing techniques of this invention.

36 Claims, 4 Drawing Sheets

U.S. PATENT DOCUMENTS

| | | | | |
|---|---|---|---|---|
| 1,477,602 A | 12/1923 | Simon | | |
| 1,674,488 A | 6/1928 | Tang | | |
| 1,987,119 A | 1/1935 | Long | | 219/39 |
| 1,992,593 A | 2/1935 | Whitney | | 219/46 |
| 2,146,402 A | 2/1939 | Morgan | | 219/523 |
| 2,202,095 A | 5/1940 | Delhaye et al. | | 219/217 |
| 2,274,445 A | 2/1942 | Greer | | 219/38 |
| 2,426,976 A | 9/1947 | Taulman | | 219/19 |
| 2,456,343 A | 12/1948 | Tuttle | | 201/67 |
| 2,464,052 A | 3/1949 | Numrich | | 219/38 |
| 2,593,087 A | 4/1952 | Baggett | | 219/217 |
| 2,593,459 A | 4/1952 | Johnson | | 219/39 |
| 2,710,909 A | 6/1955 | Logan et al. | | 219/46 |
| 2,719,907 A | 10/1955 | Combs | | 219/46 |
| 2,804,533 A | 8/1957 | Nathanson | | 219/522 |
| 2,889,439 A | 6/1959 | Musgrave | | 219/19 |
| 2,938,992 A | 5/1960 | Crump | | 219/46 |
| 3,061,501 A | 10/1962 | Dittman et al. | | 156/250 |
| 3,173,419 A | 3/1965 | Dubilier et al. | | 128/399 |
| 3,191,005 A | 6/1965 | Cox | | 219/528 |
| 3,201,738 A | 8/1965 | Mitoff | | 338/238 |
| 3,211,203 A | 10/1965 | Creed et al. | | 146/81 |
| 3,238,489 A | 3/1966 | Hay | | 388/250 |
| 3,268,846 A | 8/1966 | Morey | | 338/212 |
| 3,296,415 A | 1/1967 | Eisler | | 219/385 |
| 3,352,999 A | 11/1967 | Macoicz et al. | | 219/321 |
| 3,374,338 A | 3/1968 | Morey | | 219/529 |
| 3,385,959 A | 5/1968 | Ames et al. | | |
| 3,496,517 A | 2/1970 | Walter | | 339/18 |
| 3,564,589 A | 2/1971 | Arak | | 219/331 |
| 3,573,430 A | 4/1971 | Eisler | | 219/385 |
| 3,597,591 A | 8/1971 | Van Derlip | | 219/528 |
| 3,614,386 A | 10/1971 | Hepplewhite | | 219/312 |
| 3,621,566 A | 11/1971 | Welsh | | 29/610 |
| 3,623,471 A | 11/1971 | Bogue et al. | | 126/263.01 |
| 3,648,659 A | 3/1972 | Jones | | 119/1 |
| 3,657,516 A | 4/1972 | Fujihara | | 219/345 |
| 3,657,517 A | 4/1972 | Hoyt | | 219/535 |
| D224,406 S | 7/1972 | Heck | | D26/1 |
| 3,678,248 A | 7/1972 | Ticault et al. | | 219/525 |
| 3,683,361 A | 8/1972 | Salzwedel | | 338/322 |
| 3,686,472 A | 8/1972 | Harris | | 219/213 |
| 3,707,618 A | 12/1972 | Zeitlin et al. | | 219/336 |
| 3,725,645 A | 4/1973 | Shevlin | | 219/521 |
| 3,781,526 A | 12/1973 | Damron | | 219/538 |
| 3,831,129 A | 8/1974 | Frey | | 339/19 |
| 3,860,787 A | 1/1975 | Strobach | | 219/336 |
| 3,878,362 A | 4/1975 | Stinger | | 219/528 |
| 3,888,711 A | 6/1975 | Breitner | | 156/93 |
| 3,908,749 A | 9/1975 | Williams | | 165/2 |
| 3,927,300 A | 12/1975 | Wada et al. | | 219/381 |
| 3,933,550 A | * 1/1976 | Erwin | | 156/85 |
| 3,943,328 A | 3/1976 | Cunningham | | 219/335 |
| 3,952,182 A | 4/1976 | Flanders | | 219/309 |
| 3,968,348 A | 7/1976 | Stanfield | | 219/535 |
| 3,974,358 A | 8/1976 | Goltsos | | 219/387 |
| 3,976,855 A | 8/1976 | Altmann et al. | | 219/532 |
| 3,985,928 A | 10/1976 | Watanabe et al. | | 428/273 |
| 3,987,275 A | 10/1976 | Hurko | | 219/461 |
| 4,021,642 A | 5/1977 | Fields, Jr. | | 219/391 |
| 4,038,519 A | 7/1977 | Foucras | | 219/301 |
| 4,046,989 A | 9/1977 | Parise et al. | | 219/437 |
| 4,058,702 A | 11/1977 | Jerles | | 219/321 |
| 4,068,115 A | 1/1978 | Mack et al. | | 219/386 |
| 4,083,355 A | 4/1978 | Schwank | | 126/39 J |
| 4,094,297 A | 6/1978 | Ballentine | | 126/39 J |
| 4,102,256 A | 7/1978 | John et al. | | 99/372 |
| 4,112,410 A | 9/1978 | Wrob et al. | | 338/243 |
| 4,117,311 A | 9/1978 | Sturm | | 219/544 |
| 4,119,834 A | 10/1978 | Losch | | 392/418 |
| 4,152,578 A | 5/1979 | Jacobs | | 219/336 |
| 4,158,078 A | 6/1979 | Egger et al. | | 428/102 |
| 4,176,274 A | * 11/1979 | Lippera | | 219/522 |
| 4,186,294 A | 1/1980 | Bender | | 219/527 |
| 4,201,184 A | 5/1980 | Scheidler et al. | | 126/39 J |
| 4,217,483 A | 8/1980 | Vogel et al. | | 219/541 |
| 4,224,505 A | 9/1980 | Sturm | | 219/544 |
| 4,233,495 A | 11/1980 | Scoville et al. | | 219/386 |
| 4,245,149 A | 1/1981 | Fairlie | | 219/528 |
| 4,272,673 A | 6/1981 | Semanaz et al. | | 219/544 |
| 4,294,643 A | 10/1981 | Tadewald | | 156/293 |
| 4,296,311 A | 10/1981 | Hagglund et al. | | 219/464 |
| 4,304,987 A | 12/1981 | von Konynenburg | | 219/553 |
| 4,313,053 A | 1/1982 | Sturm | | 219/544 |
| 4,313,777 A | 2/1982 | Buckley et al. | | 156/272 |
| 4,321,296 A | 3/1982 | Rougier | | 428/212 |
| 4,326,121 A | 4/1982 | Welsby et al. | | 219/523 |
| 4,334,146 A | 6/1982 | Sturm | | 219/492 |
| 4,337,182 A | 6/1982 | Needham | | 524/609 |
| 4,346,277 A | 8/1982 | Wojtecki et al. | | 219/528 |
| 4,346,287 A | 8/1982 | Desloge | | 219/541 |
| 4,349,219 A | 9/1982 | Sturm | | 285/21 |
| 4,354,096 A | 10/1982 | Dumas | | 219/523 |
| 4,358,552 A | 11/1982 | Shinohara et al. | | 523/443 |
| 4,364,308 A | 12/1982 | John et al. | | 99/351 |
| 4,375,591 A | 3/1983 | Sturm | | 219/544 |
| 4,387,293 A | 6/1983 | Grice et al. | | 219/529 |
| 4,388,607 A | 6/1983 | Toy et al. | | 338/22 SD |
| 4,390,551 A | 6/1983 | Swartley et al. | | 426/107 |
| 4,419,567 A | 12/1983 | Murphy et al. | | 219/336 |
| 4,429,215 A | 1/1984 | Sakai et al. | | 219/528 |
| 4,436,988 A | 3/1984 | Blumenkranz | | 219/544 |
| 4,482,239 A | 11/1984 | Hosono et al. | | 355/3 |
| 4,493,985 A | 1/1985 | Keller | | 219/535 |
| 4,501,951 A | 2/1985 | Benin et al. | | 219/243 |
| 4,530,521 A | 7/1985 | Nyffeler et al. | | 285/21 |
| 4,540,479 A | 9/1985 | Sakurai et al. | | 204/427 |
| 4,606,787 A | 8/1986 | Pelligrino | | 156/632 |
| 4,633,063 A | 12/1986 | Willis | | 219/243 |
| 4,640,226 A | 2/1987 | Liff | | 119/1 |
| 4,641,012 A | 2/1987 | Roberts | | 219/331 |
| 4,658,121 A | 4/1987 | Horsma et al. | | 219/553 |
| 4,687,905 A | 8/1987 | Cunningham et al. | | 219/336 |
| 4,703,150 A | 10/1987 | Kunnecke et al. | | 219/535 |
| 4,707,590 A | 11/1987 | Lefebvre | | 219/523 |
| 4,725,717 A | 2/1988 | Harrison | | 219/528 |
| 4,751,528 A | 6/1988 | Spehrley, Jr. et al. | | 346/140 |
| 4,756,781 A | 7/1988 | Etheridge | | 156/85 |
| 4,762,980 A | 8/1988 | Insley | | 219/307 |
| 4,784,054 A | 11/1988 | Karos et al. | | 99/483 |
| 4,797,537 A | 1/1989 | Berthelius et al. | | 219/528 |
| 4,845,343 A | 7/1989 | Aune et al. | | 219/545 |
| 4,860,434 A | 8/1989 | Louison et al. | | 29/611 |
| 4,865,014 A | 9/1989 | Nelson | | 126/361 |
| 4,865,674 A | * 9/1989 | Durkin | | 156/158 |
| 4,866,252 A | * 9/1989 | Van Loo et al. | | 219/535 |
| 4,904,845 A | 2/1990 | Wonka | | 219/280 |
| 4,913,666 A | 4/1990 | Murphy | | 439/709 |
| 4,927,999 A | * 5/1990 | Hanselka | | 219/535 |
| 4,948,948 A | 8/1990 | Lesage | | 219/329 |
| 4,956,138 A | 9/1990 | Barfield | | 264/129 |
| 4,970,528 A | 11/1990 | Beaufort et al. | | 346/25 |
| 4,972,197 A | 11/1990 | McCauley et al. | | 343/704 |
| 4,982,064 A | 1/1991 | Hartman et al. | | 219/727 |
| 4,983,814 A | 1/1991 | Ohgushi et al. | | 219/545 |
| 4,986,870 A | 1/1991 | Frohlich | | 156/382 |
| 4,993,401 A | 2/1991 | Diekmann et al. | | 126/39 |
| 5,003,693 A | 4/1991 | Atkinson et al. | | 29/849 |
| 5,013,890 A | 5/1991 | Gamble | | 392/497 |
| 5,021,805 A | 6/1991 | Imaizumi et al. | | 346/76 R |
| 5,023,433 A | 6/1991 | Gordon | | 219/548 |

| Patent No. | Date | Name | Class |
|---|---|---|---|
| 5,038,458 A | 8/1991 | Wagoner et al. | 29/593 |
| 5,041,846 A | 8/1991 | Vincent et al. | 346/25 |
| 5,051,275 A | 9/1991 | Wong | 427/58 |
| 5,066,852 A | 11/1991 | Willbanks | 219/544 |
| 5,068,518 A | 11/1991 | Yasuda | 219/549 |
| 5,073,320 A * | 12/1991 | Sterzel | 264/101 |
| 5,111,025 A | 5/1992 | Barma et al. | 29/217 |
| 5,113,480 A | 5/1992 | Murphy et al. | 392/501 |
| 5,129,033 A | 7/1992 | Ferrara et al. | 392/447 |
| 5,136,143 A | 8/1992 | Kutner et al. | 219/544 |
| 5,155,800 A | 10/1992 | Rezabek et al. | 382/503 |
| 5,162,634 A | 11/1992 | Kusaka | 219/216 |
| 5,184,969 A | 2/1993 | Sharpless et al. | 445/24 |
| 5,208,080 A * | 5/1993 | Gajewski et al. | 219/522 |
| 5,237,155 A | 8/1993 | Hill | 219/544 |
| 5,252,157 A | 10/1993 | Inhofe, Jr. | 156/158 |
| 5,255,595 A | 10/1993 | Higgins | 99/378 |
| 5,255,942 A | 10/1993 | Kenworthy | 285/21 |
| 5,287,123 A | 2/1994 | Medin et al. | 346/140 R |
| 5,293,446 A | 3/1994 | Owens et al. | 392/449 |
| 5,300,760 A | 4/1994 | Batliwalla et al. | 219/549 |
| 5,302,807 A | 4/1994 | Zhao | 219/211 |
| 5,304,778 A | 4/1994 | Dasgupta et al. | 219/270 |
| 5,313,034 A * | 5/1994 | Grimm et al. | 156/274.2 |
| 5,389,184 A | 2/1995 | Jacaruso et al. | 156/378 |
| 5,397,873 A | 3/1995 | Stoops et al. | 219/450 |
| 5,406,316 A | 4/1995 | Schwiebert et al. | 347/18 |
| 5,406,321 A | 4/1995 | Schwiebert et al. | 347/102 |
| 5,408,070 A | 4/1995 | Hyllberg | 392/503 |
| 5,453,599 A | 9/1995 | Hall, Jr. | 219/544 |
| 5,461,408 A | 10/1995 | Giles et al. | 347/102 |
| 5,476,562 A | 12/1995 | Inhofe, Jr. | 156/156 |
| 5,477,033 A | 12/1995 | Bergholtz | 219/549 |
| 5,497,883 A | 3/1996 | Monetti | 206/545 |
| 5,500,667 A | 3/1996 | Schwiebert et al. | 347/102 |
| 5,520,102 A | 5/1996 | Monetti | 99/483 |
| 5,521,357 A | 5/1996 | Lock et al. | 219/543 |
| 5,571,435 A * | 11/1996 | Needham | 219/544 |
| 5,572,290 A | 11/1996 | Ueno et al. | 399/329 |
| 5,581,289 A | 12/1996 | Firl et al. | 347/104 |
| 5,582,754 A | 12/1996 | Smith et al. | 219/438 |
| 5,586,214 A | 12/1996 | Eckman | 392/503 |
| 5,618,065 A * | 4/1997 | Akiyama | 219/544 |
| 5,619,240 A | 4/1997 | Pong et al. | 347/103 |
| 5,625,398 A | 4/1997 | Milkovits et al. | 347/104 |
| 5,633,668 A | 5/1997 | Schwiebert et al. | 347/102 |
| 5,691,756 A | 11/1997 | Rise et al. | 347/102 |
| 5,697,143 A | 12/1997 | Barfield | 29/611 |
| 5,703,998 A | 12/1997 | Eckman | 392/340 |
| 5,708,251 A | 1/1998 | Naveh | 219/121.66 |
| 5,714,738 A | 2/1998 | Hauschulz et al. | 219/535 |
| 5,779,870 A | 7/1998 | Seip | 205/77 |
| 5,780,817 A | 7/1998 | Eckman et al. | 219/458 |
| 5,780,820 A | 7/1998 | Komyoji et al. | 219/543 |
| 5,781,412 A | 7/1998 | De Sorgo | 361/704 |
| 5,806,177 A | 9/1998 | Hosomi et al. | 29/846 |
| 5,822,675 A | 10/1998 | Paquet et al. | 428/561 |
| 5,824,996 A | 10/1998 | Kochman et al. | 219/529 |
| 5,829,171 A | 11/1998 | Weber et al. | 36/93 |
| 5,835,679 A | 11/1998 | Eckman et al. | |
| 5,856,650 A | 1/1999 | Rise et al. | 219/216 |
| 5,902,518 A | 5/1999 | Khazai et al. | 252/511 |
| 5,930,459 A | 7/1999 | Eckman | 392/503 |
| 5,940,895 A | 8/1999 | Wilson et al. | 4/237 |
| 5,947,012 A | 9/1999 | Ewald et al. | 99/374 |
| 5,954,977 A * | 9/1999 | Miller et al. | 219/529 |
| 5,961,869 A | 10/1999 | Irgens | 219/549 |
| 6,056,157 A | 5/2000 | Gehl et al. | 222/94 |
| 6,089,406 A | 7/2000 | Feldner | 222/103 |
| 6,147,332 A | 11/2000 | Holmberg et al. | 219/526 |
| 6,147,335 A | 11/2000 | Von Arx et al. | 219/544 |
| 6,150,635 A | 11/2000 | Hannon et al. | 219/386 |
| 6,162,385 A * | 12/2000 | Grosse-Puppendahl et al. | 264/250 |

OTHER PUBLICATIONS

"Polymers," Guide to Selecting Engineering Materials, a special issue of Advanced Materials & Presses, Metals Park, OH, ASM International, 1990, pp. 32–33.

Machine Design, "Basic of Design Engineering" Jun. 1991, pp. 429–432, 551, 882–884.

Machine Design, "Basic of Design Engineering", Jun. 1994, pp. 624–631.

Machine Design, May 18, 2000, 3 pages.

A.M. Wittenberg, "Pin Shorting Contact," Western Electric Technical Digest No. 60, Oct. 1980, p. 25.

International Search Report, Aug. 8, 2000.

* cited by examiner

ELECTROFUSING OF THERMOPLASTIC HEATING ELEMENTS AND ELEMENTS MADE THEREBY

FIELD OF THE INVENTION

This invention relates to electric resistance heating elements, and more particularly, to thermoplastic insulated resistance heating elements and methods for their manufacture.

BACKGROUND OF THE INVENTION

Electric resistance heating elements are available in many forms. A typical construction includes a pair of terminal pins brazed to the ends of a Ni—Cr coil, which is then axially disposed through a U-shaped tubular metal sheath. The resistance coil is insulated from the metal sheath by a powdered ceramic material, usually magnesium oxide. While such conventional heating elements have been the workhorse for the heating element industry for decades, there have been some widely-recognized deficiencies. For example, galvanic currents occurring between the metal sheath and any exposed metal surfaces of a hot water tank can create corrosion of the various anodic metal components of the system. The metal sheath of the heating element, which is typically copper or copper alloy, also attracts lime deposits from the water, which can lead to premature failure of the heating element. Additionally, the use of brass fittings and copper tubing has become increasingly more expensive as the price of copper has increased over the years. What's more, metal tubular elements present limited design capabilities, since their shape can not be significantly altered without losing performance.

As an alternative to metal elements, polymeric heating elements have been designed, such as those disclosed in U.S. Pat. No. 5,586,214. The '214 patent describes a process of making a polymeric heater in which an inner mold is used having a plurality of threads for receiving a resistance wire. The assembly is first wound with a wire and thereafter injection molded with an additional layer of thermoplastic material, which can contain a large amount of ceramic powder for improving the thermal conductivity of the device.

It has been discovered that injection molding a layer of thermoplastic material loaded with large amounts of ceramic powder can be difficult. The viscous polymeric material often fails to fill the mold details and can leave portions of resistance wire coil exposed. Additionally, there can be insufficient wetting between the over molded thermoplastic layer and the coil, with hardly any thermoplastic bonding between the inner mold and the over molded layer. This has led to failure of such elements during thermal cycling, since entrapped air and insufficient bonding create crack initiation sites. Such crack initiation sites and entrapped air also limit the heating elements' ability to generate heat homogeneously, which tends to create hot and cold spots along the length of the element. Crack initiation sites also lead to stress cracks that can lead to shorts in emersion applications.

Efforts have been made to minimize hot and cold spots and insufficient bonding between layers of plastic materials having electrical resistance heaters disposed between their layers. In U.S. Pat. 5,389,184, for example, a pair of thermosetting composite structures are bonded together using a heating element containing a resistance heating material embedded within two layers of thermoplastic adhesive material. The two thermosetting components are permitted to cure, and then while applying pressure to the joint, electrical energy is passed through the heating element sufficient to heat the joint to above the melting temperature of the thermoplastic adhesive material. This heat fuses the layers of the thermoplastic adhesive to join the thermosetting materials together. The heating element remains within the joint after bonding and provides a mechanism to reheat the joint and reverse the bonding process in the field.

While these procedures have met with some success, there remains a need for a less expensive, and more structurally sound, electrical resistance heating element.

SUMMARY OF THE INVENTION

This invention provides a first embodiment method of preparing an electrical resistance heating element which includes the steps of providing first and second polymeric components and disposing a resistance heating material between them. The method further includes fusing the polymeric components together, preferably while applying a vacuum to minimize trapped air.

Accordingly, this invention provides, in this embodiment, a means for reducing hot spots and cold spots, as well as reducing the amount of entrapped air bubbles within polymer heating elements at a minimal cost. The improvements presented by this embodiment provide for hermetic sealing between the polymer components as well as between the electric resistance heating material and the polymer.

A lack of hermeticity has been known to be caused by the use of core element portions supported in a mold which cannot be fully encapsulated within an overlying thermoplastic material. It is also known to result from core surface geometries that never fully fuse to the over-molded plastic layer, or from relatively cool core surfaces which are not sufficiently melted by the onrush of molten polymeric material during an injection molding process.

In addition to fusing polymeric materials using their own self-contained electrical resistance heating material, this embodiment also teaches the use of pressure alone, vacuum heat treating, hot isostatic processing, sonic or friction welding, or heating within an inert gas pressure environment in order to fuse the polymer components and evacuate air from trapped crevices and seams in the heating element construction.

Additionally, the use of heating as a method of fusing and creating hermeticity, has the additional function, if applied correctly, of stress relieving polymeric components manufactured from injection or blow molding processes, for example. Injection molded parts often contain stresses at points of sharp mold impressions or corners. Such stresses are caused when the molten polymer solidifies and shrinks in the mold. This invention can employ vacuum heating, resistance heating, or both for example, to relieve the stresses in injection molded components, which creates an additional benefit for use of the final assembly as a heating element. Since many of the stresses associated with fabricating the component are reduced or eliminated by these embodiments, there are fewer defects, or crack initiation sites, which could shorten the life of the element during cyclical heating and cooling cycles.

The use of vacuum, heat and tight-fitting injection molded parts in the preferred embodiment helps to create a hermetic heating element which has fewer imperfections and a longer useful service life.

In a further embodiment of this invention, a heating element and method of construction are provided in which first and second polymeric components are joined together with a resistance heating material therebetween. The polymeric components include retention means including a plurality of male connectors located on the first polymeric component, and a plurality of female receiving recesses located on the second polymeric component for mating with the male connectors of the first polymeric component. The polymeric components can optionally be joined together by the fusing techniques of this invention.

A BRIEF DESCRIPTION OF THE DRAWINGS

The accompanying drawings illustrate preferred embodiments of the invention, as well as other information pertinent to the disclosure, in which.

DETAILED DESCRIPTION OF THE INVENTION

The present invention provides heating elements useful as emersion heaters for liquids, contact heaters for paper, towels, or human beings, heaters for industrial and commercial applications, as well as consumer devices. As used herein, the following terms are defined: "Substantially Encapsulating" means that at least 85 percent of the surface area of the designated member is provided with polymeric material, but does not necessarily mean that the coating is hermetic;

"Serpentine Path" means a path which has one or more curves for increasing the amount of electrical resistance material in a given volume of polymeric matrix, for example, for controlling the thermal expansion of the element;

"Melting Temperature" means the point at which a polymeric substance begins to melt;

"Melting Temperature Range" means the temperature range over which a polymeric substance starts to melt and then becomes a liquid or semi-liquid;

"Degradation Temperature" means the temperature at which a thermoplastic or thermosetting polymer begins to permanently lose its mechanical or physical properties because of thermal damage to the polymer's molecular chains;

"Evacuating" means reducing air or trapped air bubbles by, for example, vacuum or pressurized inert gas, such as argon, or by bubbling the gas through a liquid polymer.

"Fusion Bond" means the bond between two polymer members integrally joined, whereby the polymer molecules of one member mix with the molecules of the other. A Fusion Bond can occur, even in the absence of any direct or chemical bond between individual polymer chains contained within said members;

"Fusion" means the physical flowing of a polymer, hot or cold, caused by heat, pressure or both;

"Electrofusion" means to cause a portion of a polymeric material to flow and fuse by resistance heating;

"Stress Relief" means reducing internal stresses in a polymeric material by raising the temperature of the material or material portion above its stress relief temperature, but preferably below its Heat Deflection Temperature.

Rod Element Embodiment

With reference to the Figures, and particularly FIGS. 1–3B thereof, there is shown a first rod-shaped embodiment of a heating element 100 having an elongated shape of about 3–10 inches in length and about 0.25–2 inches in diameter. The preferred heating element 100 may include a regulating device for controlling electric current. Such a device can include, for example, a thermistor, or a thermocouple, for preventing overheating of the polymeric materials disclosed in this invention.

Figure 1:
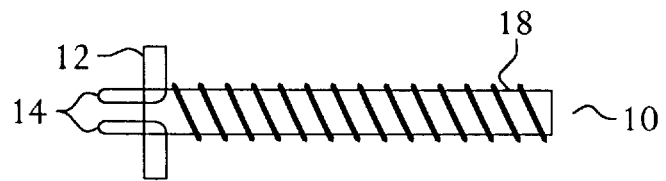
FIG. 1 is a front plan view of a preferred core having a helically wound resistance wire joined to a pair of cold pins at a flanged end.
Figure 2:
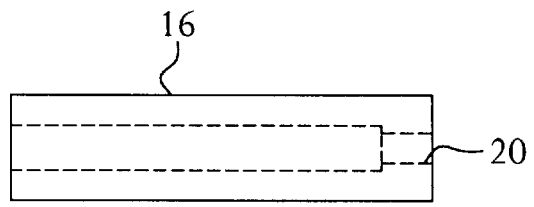
FIG. 2 is a front plan view of a preferred tubular cover for the preferred core of FIG. 1, illustrating in phantom, a telescoping longitudinal cavity.

As shown in FIG. 1, the preferred heating element 100 includes a resistance wire 18 disposed in a helical pattern along the length of the core 10. The resistance wire 18 can be disposed in a receiving groove 26, or similar surface, located on the core. The ends of the resistance wire 18 are generally grommeted, brazed, or welded to a pair of cold pins 14 disposed through the polymeric material of the flanged end 12. The core 10 is thereafter over-molded or disposed with a tubular cover 16, described in FIG. 2. The cover 16 ideally contains a longitudinal cavity 20 having a circular cross-section and a constricted end of a lesser diameter for receiving a vacuum fitting 22 in an air-tight or hermetic fashion, as shown in FIG. 3. In a preferred embodiment of this invention, the cover 16 and core 10 include a polymeric material having a similar melting temperature and coefficient of thermal expansion, more preferably the polymers of the core 10 and cover 16 include the same thermoplastic polymeric resin, but may include the same or different thermoplastics, thermosets, alloys, copolymers, and additives for cost and performance reasons.

Element 100 of this embodiment includes a core 10 and cover 16 which are preferably made from a high-temperature polymeric resin including a melting or degradation temperature of greater than 93° C. (200° F.). High temperature polymers known to resist deformation and melting at operating temperatures of about 75–85° C. are particularly useful for this purpose. Both thermoplastics and thermosetting polymers can be used. Good choices include polymeric materials and compositions that are injection moldable, since they are already known to behave well during melting and reforming operations. Preferred thermoplastic materials include, for example: fluorocarbons, polypropylene, polycarbonate, polyetherimide, polyether sulphone, polyaryl-sulphones, polyimides, and polyetheretherkeytones, polyphenylene sulfides, polyether sulphones, and mixtures and co-polymers of these thermoplastics. Preferred thermosetting polymers include epoxies, phenolics, and silicones. Liquid-crystal polymers can also be employed for improving high-temperature use. Also useful for the purposes of this invention are compression, prepegs, or sheet molding compounds of epoxy reinforced with about 50–60 wt % glass fiber. A variety of commercial epoxies are available which are based on phenol, bisphenol, aromatic diacids, aromatic polyamines and others, for example, Litex 930, available from Quantum Composites, Midland, Mich.

As stated above, the polymeric layers of this invention preferably also include reinforcing fibers 13, such as glass, carbon, aramid, steel, boron, silicon carbide, polyethylene, polyamide, or graphite fibers. The fibers 13 can be disposed throughout the polymeric material prior to molding or forming the core 10 or cover 16 of element 100, in single filament, multifilament thread, yarn, roving, non-woven or woven fabric.

In addition to reinforcing fibers, this invention contemplates the use of thermally conducting, preferably non-electrically conducting, additives 15. The thermally-conducting additives 15 desirably include ceramic powder such as, for example, $Al_2O_3$, $MgO$, $ZrO_2$, Boron nitride, silicon nitride, $Y_2O_3$, SiC, $SiO_2$, $TiO_2$, etc., or a thermoplastic or thermosetting polymer which is more thermally conductive than the polymer suggested to be used with the polymeric coating of the cover 16. For example, small amounts of liquid-crystal polymer or polyphenylene sulfide particles can be added to a less expensive base polymer such as epoxy or polyvinyl chloride, to improve thermal conductivity, Alternatively copolymers, alloys, blends, and interpenetrating polymer networks (IPNs) could be employed for providing improved thermal conductivity, better resistance to heat cycles and creep.

The preferred circuit of the rod-like heating element 100 of its invention is illustrated in FIGS. 1 and 3. The circuit includes a resistance heating material, which is ideally a resistance heating wire 18 wound into the receiving grooves 26 in a serpentine path containing about 10–50 windings, or, a resistance heating material, such as a foil or printed circuit, or powdered conducting or semi-conducting metals, polymers, graphite, or carbon. More preferably the resistance hearing wire 18 includes a Ni—Cr alloy, although certain copper, steel, and stainless-steel alloys could be suitable. Whatever material is selected, it should be electrically conductive, and heat resistant.

Figure 3A:
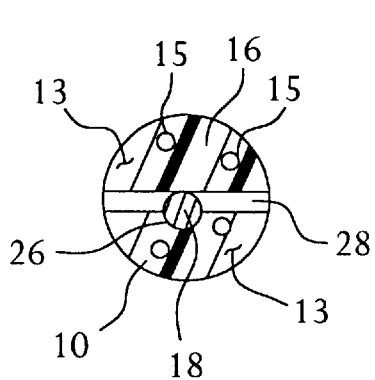
FIG. 3A is an enlarged partial cross-sectional view of a seam portion of the heating element of FIG. 3, prior to electrofusion.
Figure 3B:
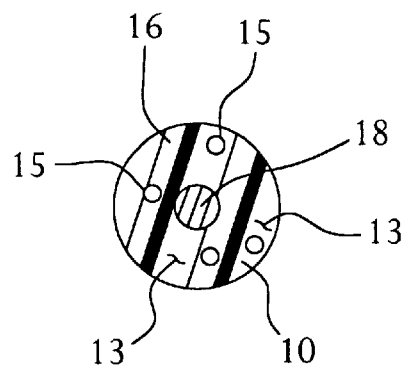
FIG. 3B is an enlarged partial cross-sectional view of the seam portion of the heating element of FIG. 3, after electrofusion.
Figure 3:
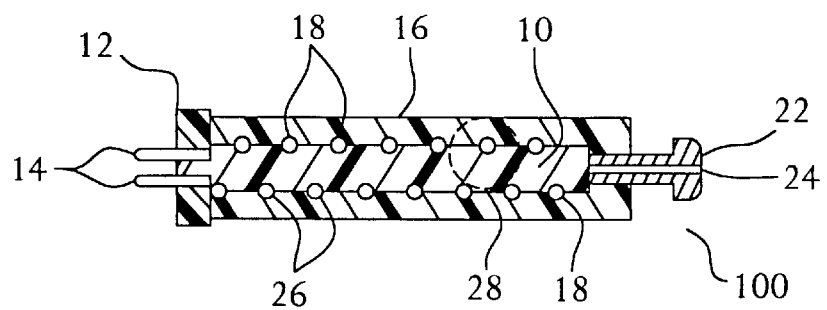
FIG. 3 is a front plan, cross-sectional view, of a complete heating element of this invention, illustrating a preferred vacuum valve attached at a longitudinal end thereof for evacuating air during electrofusing.

With reference to FIGS. 3, 3a, and 3b, there is shown in cross-section and magnified cross-section, a preferred detailed construction of a heating element 10 of this invention. The rod-like heating element 100 of this invention is desirably vacuum heat treated, hot isostatically processed, compression molded, sonic or friction welded, and/or electrofused in order to fuse the core 10 and cover 16 together. A vacuum can be applied, prior to, during and/or after the fusion step to substantially eliminate any trapped air located in the seam 28 between the core 10 and cover 16, especially around the resistance wire 18. In one example, an electrical current is directed through the electrical resistance wire to raise the immediately adjacent thermoplastic materials (e.g., about 0.01–0.2 inches from the resistance wire) above their melting point, but desirably, keeping the balance of the structure below the melting temperature. More desirably, the balance of the structure is heated to a temperature which is above the thermoplastic resin's stress relief temperature, but below its heat deflection temperature, or melting temperature range. For example, polyphenylene sulfide requires a processing temperature for molding in the range of 575–675° F., but can be stressed relieved at temperatures 300–400° F. Accordingly, if polyphenylene sulfide was used as the thermoplastic in the core 10 and cover 16 of the rod-like heating element 100, could be heated to a temperature range of about the molding temperature 575–675° F. for a period of time under vacuum conditions, which effectively reduces the amount of air in seam 28, while the molten polymer fills in the seam as shown in the difference between FIG. 3a and 3b. Preferably, the polymer flows only about 0.005 inches, and ideally less than 0.01 inches from its source.

In another example, electrofusion could be employed, with or without external heating, to join the core 10 to the cover 16 and thereby entrap the resistance wire 18. At a short distance away from the resistance heating wire, for example for about 0.01 inches, the heat from the resistance heating wire diminishes. If the amount of resistance heating through the resistance heating wire 18 is gauged to provide a molten or semi-molten state in the region of the seam 28, but heats the more distant, stressed portions of the cover 16 and core 10 to a temperature of about 300–400° F., a high degree of stress relief will occur in the resulting heating element 100. If the core 10 and cover 16 are injection molded parts, such stress relieving can substantially reduce flow patterns, shrinkage stresses, internal weld lines, and stress-raising features, as well as help to minimize sink marks, warpage, cracks and other unacceptable characteristics in the molded parts.

It is understood that the degree of resistance heating necessary to accomplish both thermoplastic melting in the seam 28 region, as well as stress relief throughout the remainder or substantial remainder of the component, will depend largely on the thermoplastic or thermoset employed, and the degree to which the polymer is enhanced with fillers, fibers or thermally conductive additives.

It may therefore be desirable to provide thermally conductive additives and fiber reinforcement in selected areas of the component, for example, in the cover 16, and not in the core 10, or vice versa. Moreover, the amount of fibers, fillers and additives can be gradually dispersed throughout the cross-section of the polymeric component, for example, the cover 16 could include a large amount of thermally conductive additives near the longitudinal cavity 20, and less of this component as one gets closer and closer to the surface of the material, or vice versa.

It is further understood that, although thermoplastic plastics are most desirable for the purposes of this invention because they are generally heat-flowable, some thermoplastics, notably polytetraflouroethylene (PTFE) and ultra high-molecular-weight polyethylene (UHMWPE) do not flow under heat alone. Also, many thermoplastics are capable of flowing without heat, under mechanical pressure only. On the other hand, thermosetting polymers are usually heat-settable, yet many thermoset plastics such as silicone, epoxy and polyester, can be set without being heated. Another thermoset material, phenolic, must first be made to flow under heat, like a thermoplastic, before it can be heat-set.

For the purposes of this invention, it is understood that the polymer material, whether it be thermoset or thermoplastic, be capable of flowing around the electrical resistance heating wire 18. It is understood that this can be accomplished by electrofusion or melting of the polymer material closest to the electric resistance heating element, and it is also understood that high pressures, plastic welding techniques, and possibly elevated controlled atmospheres and pressures could be used to make the polymeric material flow around the electric resistance heating wire without conducting electric current through the wire itself One way of accomplishing this is through vacuum heating or a hot isostatic processing method in which the element as it is shown in FIG. 3a is introduced into a chamber in which high pressure is applied to force the polymeric material to flow around the heating element. Such controlled heat and pressure can be exerted in a controlled environment, such as a vacuum chamber 30. Preferably, only a limited amount of pressure and/or heat is applied so as not to entirely liquefy the resin, although, if the element's shape can be retained in a mold or form, for example, complete liquefication would be acceptable.

Vacuum pressure can also be exerted through a vacuum fitting 22 through a vacuum channel 24 disposed through the vacuum fitting 22. One end of the vacuum fitting 22 is located in the reduced diameter portion of the longitudinal cavity 20 of the cover 16, preferably in a hermetic seal so as to evacuate air molecules before, during or after the electrofusion stop. Accordingly, it is helpful if the electrofusion step, when employed, melts the polymeric material which is in close proximity to the resistance wire 18, e.g., within about 0.01–0.2 inches away from the surface of the resistance wire 18, more preferably less than about 0.1 inch from the surface of the resistance wire 18. In this way, the overall shape of the cover 16 can be retained, and the supporting geometry for the vacuum fitting 22 can remain in place during electrofusion without distortion, or the use of additional molds or forms to retain the geometry of the part. Such a procedure also enables fine injection molded designs in the core 10 and cover 16 to be preserved.

Figure 4:
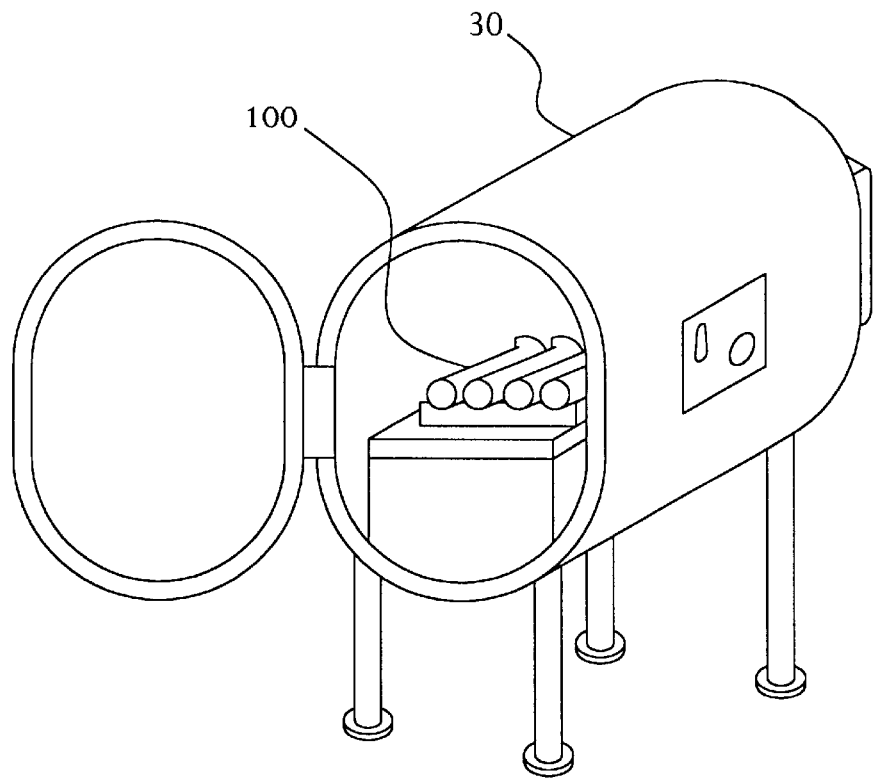
FIG. 4 is a vacuum chamber showing a plurality of heating elements disposed therein for vacuum electrofusion or vacuum convective heat fusion.

With reference to FIG. 4 there is shown a vacuum chamber 30 for receiving a plurality of heating elements 100. Although the vacuum chamber 30 could be a vacuum furnace, capable of heating the elements 100 under vacuum or an inert gaseous atmosphere, such as argon, it could also be a hot isostatic pressure chamber.

Ideally, the vacuum chamber 30 should have means for making an electrical connection to the plurality of heating elements 100 so that the electrofuision process described above can be accomplished while the elements are subject to vacuum or inert gas pressure.

Figure 5:
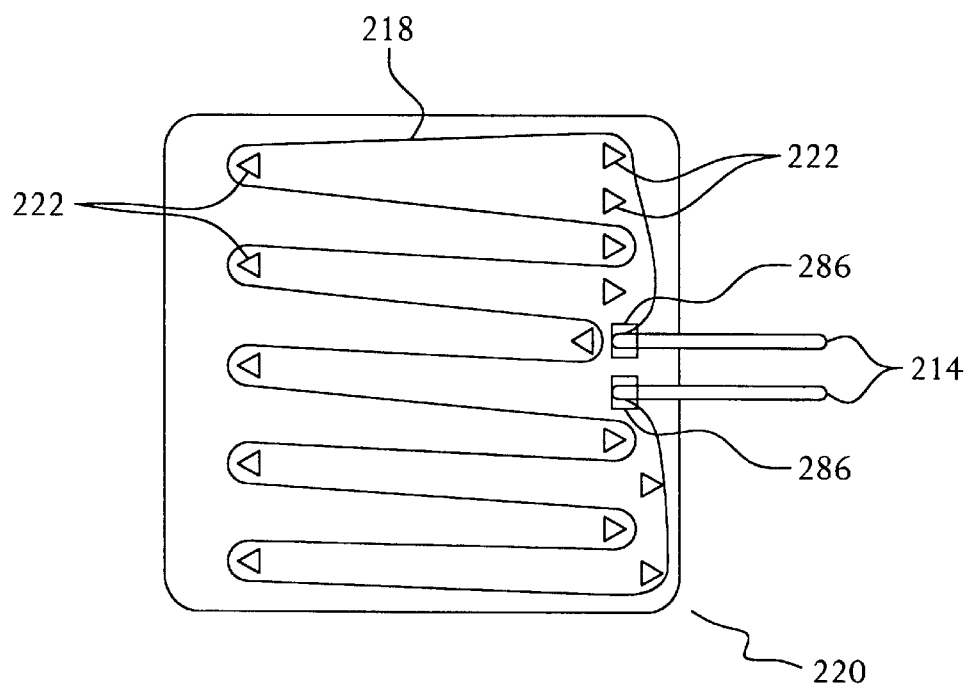
FIG. 5 is a top plan view of a lower plate of an alternative planar heating element embodiment showing a resistance wire circuit.
Figure 6:
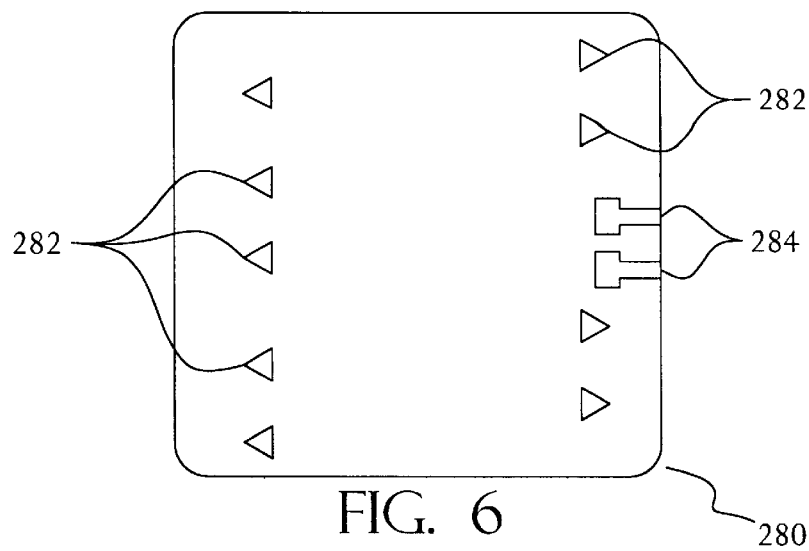
FIG. 6 is a top plan view of a top plate for the planar heating element embodiment.
Figure 7:
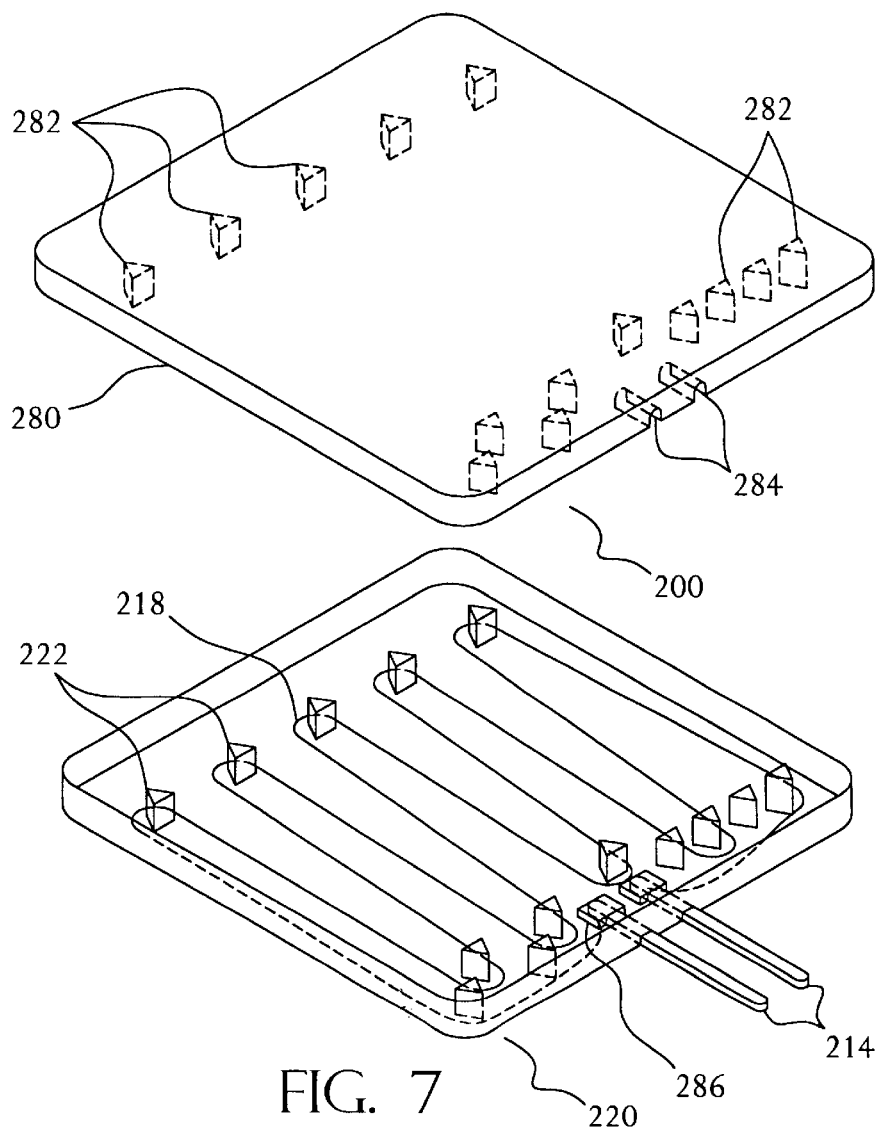
FIG. 7 is a front perspective and exploded view of the planar heating element described in FIGS. 5 and 6.

With reference to FIGS. 5–7, there is shown a planar heating element 200. The planar heating element 200 is ideal for heating applications requiring a flat surface, such as in the plating industry or as a cooking surface, for applying heat transfer images to clothing, etc. As shown in FIG. 5, the planar heating element 200 includes a lower plate made of the same polymeric materials described for the rod-like heating element 100. Ideally, the lower plate is injection molded to provide a plurality of integral retaining pins 222, which can be configured in a number of shapes, such as circles, triangles or ovals, so long as they are designed to be removed easily from a mold. The other half of the planar heating element, shown in FIG. 6, is the upper plate 280, which also can be injection molded to provide a plurality of pin receiving recesses 282 for mating with the retaining pins 222 of the lower plate 220 prior to HIP, pressure or electrofusion processing.

In the preferred embodiment, a resistance heating wire 218 preferably made of Ni—Cr wire, is wound around the retaining pins 222 to form a circuit. The ends of the resistance heating wire 218 are grommeted to a pair of cold pins 214 with grommets 286. Alternatively, the cold pins can be welded or brazed to the resistance heating wire 218. Once the circuit path is applied to the lower plate 220, the upper plate 280 is disposed over the circuit path and the retaining pins 222 are inserted into the pin receiving recesses 282. Additionally, the upper plate 280 can include cold pin recesses 284 for receiving the grommets 286 and cold pins 214 located on the lower plate. As the upper and lower plates 280 and 220 respectively are joined together as shown in FIG. 7, the retaining pins 222 and pin receiving recesses 282 are mated together so as to minimize any excess spacing between the upper and lower plates 280 and 220. Upon heating, such as by compression molding, vacuum heating, hot isostatic processing or by electrofusion, the thermoplastic polymer near the resistance heating wire 218 begins to melt or fuse, as well as a portion of the retaining pins 222 and walls of pin receiving recesses 282, effectively reducing air pockets in the region where the upper and lower plates 280 and 220 meet. Ideally, all of the air space between the plates 220 and 280 is eliminated before fusing begins, although this is not necessary in order to practice the invention. Most preferably, about 75–95% of the air space originally found between the plates is eliminated by the fusion and vacuum processes of this invention.

Figure 8:
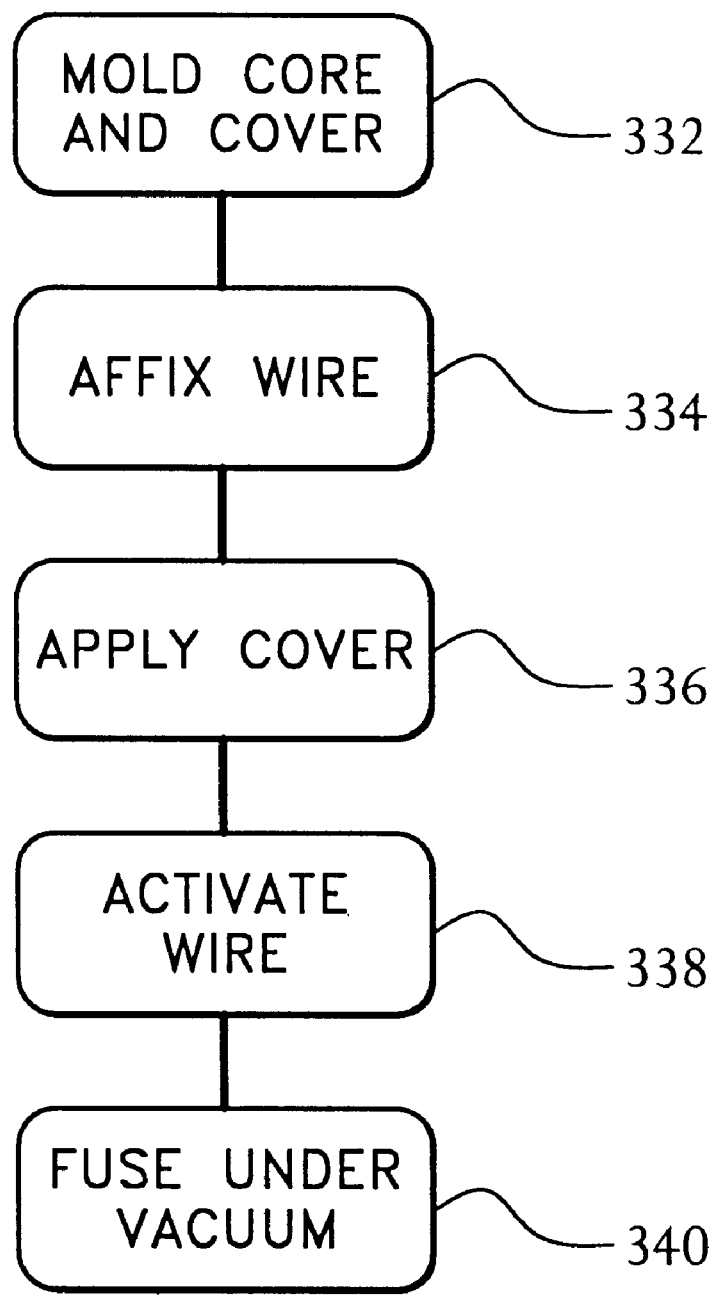
FIG. 8 is a preferred flow diagram for manufacturing heating elements pursuant to this invention.

As shown in FIG. 8, a preferred process for manufacturing heating elements pursuant to this invention is provided. In step 332, a core and cover portion are injection molded in a pre-configured design. Next, a resistance heating wire is affixed to the core portion in fixing step 334. The cover is then applied in step 336 to form a heating element precursor, preferably by activating the wire in step 338, in which electrofusion occurs, preferably under a vacuum in step 340. As stated previously, the vacuum step can occur either prior to, after, or during the electrofusion step 338 or other fusion processes discussed above. Alternatively, the electrofusion 338 and vacuum step 340 can be substituted by a pressurization or hot isostatic processing step or use of an inert gas, or a combination of one or more of these processes.

The concepts described for this invention can produce thermoplastic and thermosetting elements of complex geometries. For example, a coffee cup could be designed with heated walls in which a pair of thermoplastic cups are nested together prior to electrofusion with an electrical resistance heating element therebetween. The cover or upper plates described above can be designed in significant detail, with radiating fins or end-use features, such as handles, retention means, curves or other complex geometries.

From the foregoing, it can be realized that this invention provides processing methods for the fusion of polymeric components for electrical resistance heating applications, as well as improved heating element designs. The processes described effectively reduce the amount of hot and cold spots along heating element geometries for improving homogeneous heating, while simultaneously improving creep resistance or the ability of the element to undergo cyclical heating and cooling without delamination and failure. Although various embodiments have been illustrated, this was for the purpose of describing, but not limiting the invention. Various modifications, which will become apparent to one skilled in the art, are within the scope of this invention described in the attached claims.

I claim:

1. A method of manufacturing an electrical resistance heating element, comprising:

a) providing first and second mating polymeric components having first and second facing surfaces thereon respectively, and a resistance heating material disposed between said first and second facing surfaces; and b) fusing said first and second polymeric components together at least along said first and second facing surfaces, whereby said resistance heating material is captured between said first and second mating polymeric components, wherein said fusing step (b) comprises stress relieving an unmelted portion of the polymer in said first and second polymeric components.

2. The method of claim 1 wherein said providing step (a) provides a gap between said first and second polymeric components.

3. The method of claim 1 wherein said providing step (a) provides said first surface of said first polymeric component with an impression for receiving said resistance heating material.

4. The method of claim 1 wherein said fusing step (b) comprises joining a portion of said first and second polymeric components by one or more of the following processes: vacuum heat treating, hot isostatic processing, sonic welding, friction welding, compression molding, or electrofusing.

5. The method of claim 4 wherein said fusing step (b) substantially encapsulates said resistance heating material in a fused portion of said polymeric components.

6. The method of claim 1 wherein said providing step (a) comprises providing said first and second polymeric components with the same thermoplastic resin.

7. The method of claim 1 further comprising providing said first and second polymeric components with retention means for retaining said resistance heating material.

8. The method of claim 7 wherein said retention means comprises a plurality of pins located in said first polymeric component and a plurality of pin receiving recesses located in said second polymeric component for mating with said pins of said first thermoplastic component.

9. The method of claim 1 wherein said providing step (a) provides a gap between said first and second polymeric components.

10. The method of claim 1 wherein said joining step (b) further comprises fusing said first and second polymeric components together.

11. The method of claim 1 wherein said male connectors comprise a shape of a circle, triangle or oval.

12. An electrical resistance heating element, comprising:
a first polymeric component having a first surface thereon for receiving a resistance heating material:
a resistance heating material disposed on said first surface, and
a second polymeric component having a second surface for covering over said resistance heating material on said first surface;
a substantial portion of said first and second surfaces being fused together by heat, pressure or both, whereby an unmelted portion of the polymer in said first and second polymeric components is stress relieved.

13. The heating element of claim 12 wherein said resistance heating material comprises a Ni–Cr wire.

14. The method of claim 12 wherein said first and second polymeric components are fused together to substantially eliminate any seam between them visible to the naked eye.

15. The heating element of claim 14 wherein said first and second polymeric components comprised the same thermoplastic resin.

16. The heating element of claim 12 wherein said first polymeric component comprises retention means for retaining said resistance heating material in a pre-determined circuit path.

17. The heating element of claim 16 wherein said retention means comprises a plurality of mating pins and pin receiving recesses located on said first and second surfaces respectively.

18. The heating element of claim 12 wherein said first and second polymeric components are injection molded, creating stress-raising features in said polymeric components.

19. The heating element of claim 12 wherein said resistance heating material is disposed within a gap formed between said first and second surfaces.

20. A method of manufacturing an electrical resistance heating element, comprising:
a) providing first and second molded thermoplastic components containing a plurality of stress-raising features therein, and having first and second facing surfaces thereon, and a resistance heating material;
b) sandwiching said resistance heating material between said first and second thermoplastic components to form a seam; and
c) electrofusing a portion of said first and second surfaces of said first and second thermoplastic components so as to substantially eliminate said seam; and
d) stress-relieving by heating a remaining unmelted portion of said first and second thermoplastic components which contain a portion of said plurality of stress-raising features.

21. The method of claim 20 further comprising applying a pressurized inert gaseous atmosphere or a vacuum to said first and second thermoplastic components and said resistance heating material to minimize air pockets in said heating element during said electrofusing step (c).

22. The method of claim 21 wherein said applying an inert atmosphere or vacuum step occurs immediately before or after said electrofusion step.

23. The method of claim 20 wherein said first and second thermoplastic components are fitted with a vacuum fitting for evacuating said portion of air from said seam.

24. An electrical resistance heating element comprising a pair of thermoplastic components having a resistance wire receiving surface therebetween; a resistance heating wire disposed on said resistance heating wire receiving surface, said thermoplastic components being joined together by fusion to form a fusion bond between said thermoplastic components wherein at least one of said thermoplastic components comprises a non-electrically conductive, thermally conductive additive for improving the thermal conductivity of said element.

25. The heating element of claim 24 wherein said thermoplastic components comprise the same thermoplastic resin.

26. The heating element of claim 24 wherein said resistance heating material comprises a Ni–Cr wire.

27. The heating element of claim 24 wherein said thermoplastic components are injection molded.

28. The heating element of claim 22 wherein said non-electrically conductive, thermally conductive additive comprises a ceramic powder.

29. The heating element of claim 22 wherein said thermoplastic components further comprise a plurality of reinforcing fibers.

30. The heating element of claim 28 wherein said reinforcing fibers are disposed at least within a yarn, roving, non-woven or woven fabric.

31. A heating element comprising a pair of fusable polymeric components having a resistance heating material disposed therebetween, said fusable polymeric components including a non-electrically conducting, ceramic additive for improving the thermal conductivity of said fusable polymeric components, said fusable polymeric components being fusion bonded together to substantially encapsulate said resistance heating material.

32. The heating element of claim 30, wherein said ceramic additive is not uniformly dispersed in said fusable polymeric components.

33. A method of manufacturing an electrical resistance heating element, comprising:
  a) providing first and second mating polymeric components having first and second facing surfaces thereon respectively, and a resistance heating material disposed between said first and second facing surfaces; and
  b) joining said first and second polymeric components together at least along said first and second facing surfaces, whereby said resistance heating material is captured between said first and second mating polymeric components,
    i) wherein said first and second polymeric components comprising retention means including a plurality of male connectors located on said first polymeric component, and a plurality of female receiving recesses located on said second polymeric component for mating with the male connectors of the first polymeric component.

34. An electrical resistance heating element, comprising:
  a first polymeric component having a first surface thereon for receiving a resistance heating material;
  a second polymeric component having a second surface thereon;
  a resistance heating material disposed between said first and second surfaces;
  said first and second polymeric components comprising retention means including a plurality of male connectors located on said first polymeric component, and a plurality of female receiving recesses located on said second polymeric component for mating with the male connectors of the first polymeric component.

35. The method of claim 34 wherein said first and second polymeric components are fused together.

36. The heating element of claim 34 wherein said first and second polymeric components comprise molded components.

* * * * *